United States Patent [19]
Kudo et al.

[11] 3,804,674
[45] Apr. 16, 1974

[54] OXYGEN ELECTRODE MATERIAL

[75] Inventors: Tetsuichi Kudo; Motoko Yoshida, both of Tokyo; Osamu Okamoto, Osaka, all of Japan

[73] Assignee: Hitachi, Ltd., Tokyo, Japan

[22] Filed: May 19, 1972

[21] Appl. No.: 255,083

[30] Foreign Application Priority Data
May 19, 1971  Japan.............................. 46-33247

[52] U.S. Cl......................... 136/120 FC, 136/86 D
[51] Int. Cl............................................. H01m 13/00
[58] Field of Search............ 136/120, 120 FC, 86 D; 252/461, 462, 521, 512

[56] References Cited
UNITED STATES PATENTS
3,404,040  10/1968  Mitoff et al. ...................... 136/86 F
3,405,008  10/1968  Dilworth et al............... 136/120 FC
3,644,147  2/1972  Young.............................. 136/86 D FOREIGN PATENTS OR APPLICATIONS
636,309  2/1962  Canada............................ 136/86 D
789,089  7/1968  Canada............................ 136/86 F OTHER PUBLICATIONS
Meadowcroft, Low–Cost Oxygen Electrode Material, Nature, Vol. 226 pages 847–848, May 30, 1970.

*Primary Examiner*—Anthony Skapars
*Attorney, Agent, or Firm*—Craig and Antonelli

[57] ABSTRACT

A material most suitable for use as an oxygen electrode consists of a metal oxide having perovskite structure represented by the general formula:

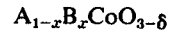

wherein A is Nd and/or Sm, B is Ba, Ca and/or Sr, $0.01 \leq X \leq 0.9$, and $0 \leq \delta \leq 0.5$.

13 Claims, 4 Drawing Figures

OXYGEN ELECTRODE MATERIAL

BACKGROUND OF THE INVENTION

This invention relates to oxygen electrode materials and, more particularly, to such materials which can be used to produce an excellent oxygen electrode for secondary batteries of the air-metal type such as air-zinc batteries and fuel cells such as air-hydrogen type fuel cells.

Oxygen electrodes heretofore employed are made of such material as porous carbon and porous metallic nickel and contain a metallic catalyst such as platinum. These electrodes, however, use expensive precious metal catalysts, which is a problem from the standpoint of economy. In addition, these electrodes cannot be used as a charging electrode for charging the metal electrode (cathode) of air-metal type batteries. If the usual oxygen electrode itself is used as a charging electrode, active oxygen generated from the oxygen electrode during the charging attacks the electrode. Therefore, the electrode is deteriorated very soon, and even those having comparatively long service life become useless in several charging and discharging cycles, e.g. 30 cycles.

The usual air-metal type battery, for instance an air-zinc secondary battery, using the prior-art oxygen electrode is usually charged by using a third electrode for the charging purpose. The use of the third electrode for charging, however, complicates the battery construction. Also, accessory parts such as a charging-discharging switch, are required. Therefore, the cost of the battery is increased and the discharging output density or energy density per unit weight of the battery is reduced.

Recently, materials which have a perovskite structure, such as $La_{0.80}Sr_{0.20}CoO_3$, have been provided as a low-cost oxygen electrode material, as disclosed in, for instance, *Nature*, vol. 226 pages 847–848, May 30, 1970, and the *Electrochemical, Sec. Extended Abstracts*, Abstract No. 8, pages 28–29, Fall Meeting, Atlantic, Oct. 4–8, 1970. These materials are fairly superior in performance and cost compared to the conventional oxygen electrode materials. They are still inferior in the aspect of service life.

SUMMARY OF THE INVENTION

An object of the present invention is to provide an electrode material, which can eliminate the aforementioned drawbacks inherent in the conventional oxygen electrode and also provide an inexpensive oxygen electrode having superior performance and prolonged service life.

The oxygen electrode made of the electrode material according to the present invention can be used as charging electrode for the charging of a metal electrode. Also, with this electrode it is possible to realize an air-metal type secondary battery such as air-zinc battery, which is inexpensive and provides increased energy density, as well as fuel cells such as oxygen-hydrogen fuel cell.

The oxygen electrode material according to the invention consists of a metal oxide having perovskite structure represented by the general formula $A_{1-x}B_xCoO_{3-\delta}$, wherein A is at least one element selected from the group consisting of neodymium and samarium, B is at least one element selected from the group consisting of barium, calcium and stontium, $0.01 \leq x \leq 0.9$, and $0 \leq \delta \leq 0.5$.

If the value of $x$ is beyond the range between 0.01 and 0.9, the oxygen electrode made of this metal oxide material has performance that is too inferior to be used in practice. More particularly, if the $x$ value is above 0.9, the perovskite structure of the metal oxide is lost. On the other hand, if the $x$ value is below 0.01, the catalysis against the oxygen gas is too weak so that the metal oxide cannot be used as the oxygen electrode material. For the above grounds or reasons, the preferable value of $x$ is limited to a range between 0.01 and 0.9, and more preferably between 0.1 and 0.2.

Generally, by reducing the $x$ value the specific electric conductivity is reduced, and increasing the value of $x$ has the effects of reducing oxygen ion diffusion coefficients, resulting in reduced electrode reaction.

The metal oxide compound according to the present invention is obtained by sintering a powdery mixture containing A element oxide, B element carbonate and CoO at a temperature between 1,100° C. and 1,400° C. for about 6 hours. Depending upon the sintering temperature and material composition, however, there may be formed compounds slightly insufficient in oxygen, with $3 - \delta$ being the average number of oxygen atoms in unit cell of crystal.

The above compound may also be obtained from mixtures of acetates or nitrates of constituent elements by gradually heating the mixture material up to a temperature of 500° C. to cause sufficient thermal decomposition and subsequently sintering the resultant material at a temperature ranging between 900° C. and 1,100° C. for about 6 hours. According to this method, the sintering temperature may be reduced so that it is possible to obtain finer compound particles than 1 micron. Thus, this method is preferable as the method of manufacturing a powdery electrode material.

A more preferable method is to add an alkaline solution such as ammonia water to a blend aqueous solution containing soluble salts of the constituent elements, followed by causing precipitation of hydroxides of the constituent elements, drying the precipitate by the freezing method and then heating the dry material to a temperature of 600° C. to 900° C. to thereby obtain a powdery compound. According to this method, extremely fine particles with grain size less than 0.1 micron may be obtained.

Another similarly preferable method is to use a blend aqueous solution containing soluble organic salts of the constituent elements, which is dried by the freezing method and then heated to a temperature of 600° C. to 900° C. In this case, the grain size of obtained particles may be extremely fine, being less than 0.1 micron.

One of the important features of the perovskite structure compounds obtainable by the above methods is that, unlike the usual oxides, their specific electric conductivity at room temperature is extremely high. By way of example, results of measurements of specific electric conductivity at 25° C. of samples obtained in the above manner and generally represented as $Nd_{1-x}Sr_xCoO_{3-\delta}$ but with different values of $x$ (solid dissolution ratio between Nd and Sr) are listed in Table 1 below:

Table 1

| Composition | Specific resistance (in ohm . cm) |
| --- | --- |
| $Nd_{0.9}Sr_{0.1}CoO_3$ | $2 \times 10^{-3}$ |
| $Nd_{0.8}Sr_{0.2}CoO_3$ | $5 \times 10^{-4}$ |
| $Nd_{0.7}Sr_{0.3}CoO_3$ | $3 \times 10^{-4}$ |
| $Nd_{0.6}Sr_{0.4}CoO_3$ | $2 \times 10^{-4}$ |
| $Nd_{0.5}Sr_{0.5}CoO_3$ | $3 \times 10^{-4}$ |

It is an essential requirement for the electrode material to have high specific electric conductivity. In this aspect, the electrode material according to the present invention is superior to other well-known oxide material such as lithiated nickel oxides ($Li_xNi_{1-x}O$), as is apparent from the above Table.

Another important feature of the electrode material according to the present invention is its intense catalytic activity against oxygen electrode reaction, which is peculiar to such compounds. The fact that the potential attainable with the electrode according to the present invention is high compared to the prior-art carbon electrode using a platinum catalyst, as demonstrated in the following Embodiment 1, is attributable to the intense catalysis of the electrode compound.

In addition, these compounds are insoluble in dense alkaline solutions, chemically stable and excellently resist oxidation. For example, these metal oxide compounds never undergo denaturing when they are held at an anodic potential for electrolysis in alkaline solutions. This also constitutes the basic feature of the compound according to the present invention.

BRIEF DESCRIPTION OF THE DRAWINGS

The oxygen electrode materials according to the present invention will be further understood from the following detailed description and the accompanying drawings, in which.

The oxygen electrodes using metal oxides having perovskite structure according to the present invention as mentioned above can be classed in two types.

The first type electrodes, which are planar porous electrodes, are obtained by adding a suspension containing Teflon (trade name of polytetrafluoroethylene) to the perovskite type oxide powder according to the present invention, applying the paste of the resultant mixture to a desired alkali-resisting metal net and press molding the resultant system. The electrode of this type is hereinafter referred to as "Teflon bond-type electrode."

Figure 1:
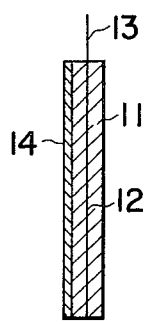
FIG. 1 is a schematic view of an embodiment of the electrode according to the present invention.

FIG. 1 schematically shows the structure of this type of electrode of the invention. In the Figure, reference numeral 11 designates a molding of a mixture of the metal oxide powder obtained in accordance with the present invention and Teflon powder, reference numeral 12, designates a metal net buried in the molding 11, reference numeral 13—a lead wire attached to the edge of the metal net 12, and numeral 14—a porous cloth of such water-proof material as Teflon for preventing the leakage of the electrolyte. The porous cloth may be dispensed with in some instances.

The second type of electrodes, which are also porous electrodes, are obtained by press molding the oxide powder obtained as the oxygen electrode material according to the present invention, either alone or in the form of a mixture with a foaming agent such as ammonium hydrogen bicarbonate, and sintering the molding thus obtained. The electrode of this type is hereinafter referred to as "sintered oxygen electrode."

Figure 2:
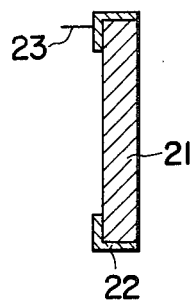
FIG. 2 is a schematic view of another embodiment of the electrode according to the present invention.

FIG. 2 schematically shows the structure of this electrode. In the Figure, reference numeral 21 designates a planar sintered body of the metal oxide according to the invention, reference numeral 22—a terminal formed by thermally fixing silver paste to the edge portion of the sintered body 21, and reference numeral 23—a lead wire attached to the terminal 22. Similar to the usual sintered nickel electrode, the electrode characteristics of the sintered oxygen electrode according to the invention may be improved by treating with a water-proof agent such as Teflon.

The method of manufacture and characteristics of the electrode according to the present invention will now be described in detail in conjunction with some embodiments thereof.

DESCRIPTION OF THE PREFERRED EMBODIMENTS

EMBODIMENT 1

An aqueous solution containing 1 mol of cobalt acetate, 0.8 mol of neodymium acetate and 0.2 mol of strontium acetate was thermally dried, and the resultant dry substance was heated to a temperature of 900° C., followed by baking at that temperature for about 6 hours to obtain an oxide material in the powdery form. This material was then immersed in a dilute acetic acid solution for removing those oxides not forming any solid solution. Then, the steps of centrifugal separation and washing with water are repeated three times, and the resultant powder was dried. To 10 grams of the metal oxide powder ($Nd_{0.8}Sr_{0.2}CoO_3$) thus obtained, which constitutes the oxygen electrode material, was added 6.0 milliliters of a suspension containing 20 weight percent of Teflon powder, and the resultant system was sufficiently agitated to obtain coagulation of the powdery oxide material bonded with Teflon particles. The coagulated muddy substance thus obtained was applied on a metal net by about 75 milligrams per one square centimeter of the net area. The resultant system was then subjected to compression with a pressure of 500 kg/cm², followed by a thermal treatment at a temperature of about 250° C., thus obtaining a Teflon bond type oxygen electrode.

Figure 3:
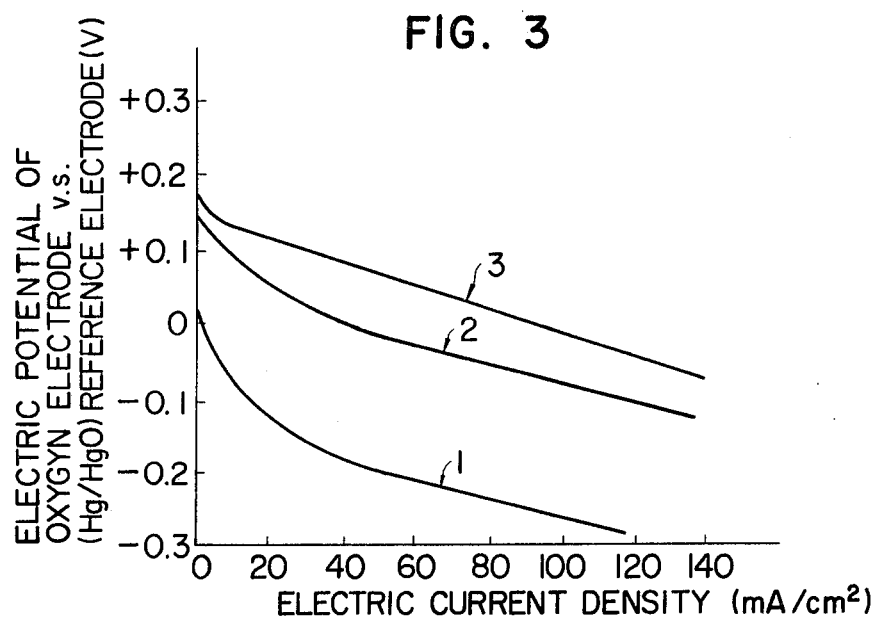
FIG. 3 is a graph showing potential versus current density characteristics of electrodes according to the present invention (curves 2 and 3) and a conventional electrode (curve 1)

A potential versus current density characteristic of this electrode obtained by using a mercury electrode as reference electrode is shown by curve 2 in FIG. 3. In the Figure, curve 1 represents similar characteristic of a conventional carbon electrode using a platinum catalyst. It will be seen from these curves that with the electrode according to the present invention the potential is high for the same current density compared to the conventional electrode.

EMBODIMENT 2

An aqueous solution containing 1 mol of cobalt acetate, 0.5 mol of neodymium acetate and 0.5 mol of strontium acetate was treated in the same way as in the preceeding Embodiment 1 to obtain a metal oxide powder ($Nd_{0.5}Sr_{0.5}CoO_3$), the electrode material according to the present invention. To this material, 10 percent by weight of ammonium bicarbonate was added, and the admixture was molded with a pressure of 100 kg/cm². The molding was then sintered in air at a temperature of 900° C. for about 20 minutes to obtain a thin sintered plate, which was then immersed in a Teflon suspension containing 10 percent by solid weight of Teflon and then placed in an evacuated desicator for about 30 minutes to impregnate Teflon. Thereafter, the sintered plate was heated to 250° C.

A potential versus current density characteristic of the sintered electrode obtained in the above manner is shown by curve 3 in FIG. 3. As is shown, it is slightly superior to the characteristic of the electrode of the preceeding Embodiment 1. Also, the deterioration of the characteristics is shown to be extremely slight, and no appreciable potential decrease was recognized even after continuous operation for 500 hours.

EMBODIMENT 3

To an aqueous solution containing 1 mol of cobalt nitrate, 0.1 mol of barium nitrate, 0.1 mol of strontium nitrate, 0.1 mol of calcium nitrate and 0.7 mol of samarium nitrate was gradually added an ammonium hydroxide solution to cause co-precipitation of hydroxides of component metal elements. The precipitate was then treated by the usual freezing-drying method, and then sintered in air at a temperature of 900° C. for about 6 hours. To the oxide material ($Sm_{0.7}Ba_{0.1}Ca_{0.1}Sr_{0.1}CoO_3$) in a fine powdery form obtained in the above manner was added 20 percent by weight of ammonium carbonate, and the admixture was molded with a pressure of 100 kg/cm² into a plate from which was then sintered at a temperature of 1,000° C. The thin sintered plate obtained in this manner was then subjected to the same Teflon impregnation process with an aqueous suspension or dispersion as in the preceeding Embodiment 2, thus obtaining a sintered oxygen electrode.

Figure 4:
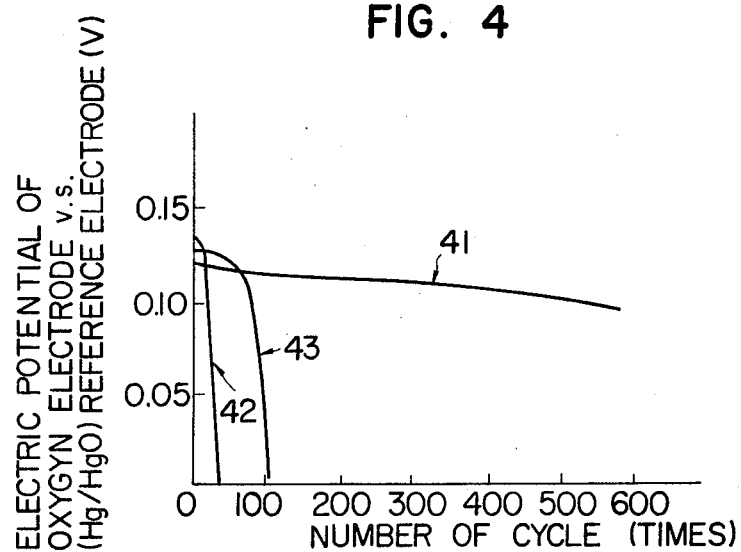
FIG. 4 is a graph showing potential versus charging and discharging cycles characteristics of electrodes according to the present invention applied to air-zinc type secondary battery.

An air-zinc battery was constructed by using this electrode to measure electrode potential versus charging and discharging cycles characteristic thereof, by using a mercury electrode as reference electrode. The charging was done with a current density of 10mA/cm² for 5 hours by having the oxygen electrode as opposite electrode to the zinc electrode, and the discharging was done with 20mA for 2 hours. Curve 41 in FIG. 4 shows the results of measurements. As is seen, the potential at the 500-th cycle is lower than the initial voltage characteristic only by 0.02 volt.

Curves 42 and 43 in FIG. 4 represent respective potential versus charging and discharging cycles characteristics of comparison sintered oxygen electrodes made of metal oxides of respective compositions given as $La_{0.7}Ca_{0.1}Sr_{0.1}Ba_{0.1}CoO_3$ and $Pr_{0.7}Ca_{0.1}Sr_{0.1}Ba_{0.1}CoO_3$ and having perovskite structures obtained by the same method as the above Embodiment 3. The conditions for the charging and discharging tests are the same as for the case of curve 41. As is apparent from these curves, if La or Pr is substituted for Nd and/or Sm according to the present invention, the characteristic soon deteriorates in a very few charging and discharging cycles, so these substitution elements are undesired from the standpoint of service life. Moreover, it has been experimentally proven that if La is used as the rare earth element, the lifetime of the electrode in continuous discharging (causing cathodic current continuously) is only 200 hours. This is because in metal oxides of perovskite structures including La as the rare earth element (for instance $La_{0.8}Sr_{0.2}CoO_3$), the oxides will very readily wet in the electrolyte. Thus, Nd and/or Sm which are A elements, the formula for the electrode material according to the present invention have quite different characteristics from those of La and Pr which are also rare earth elements.

EMBODIMENT 4

Sintered oxygen electrodes of various compositions listed in Table 2 below were produced in the same method as in the previous Embodiment 2. This table also lists results of measurements of characteristics of these electrodes.

Table 2

| Sample number | Composition formula | Voltage (in volts) in discharging with 100 mA/cm² v.s. (Pg/HgO) reference electrode |
|---|---|---|
| 1 | $Nd_{0.7}Sm_{0.1}Sr_{0.1}Ba_{0.1}CoO_{3-\delta}$ | −0.020 |
| 2 | $Nd_{0.5}Sm_{0.1}Ca_{0.1}Sr_{0.1}Ba_{0.2}CoO_{3-\delta}$ | −0.011 |
| 3 | $Nd_{0.3}Ba_{0.7}CoO_{3-\delta}$ | −0.045 |
| 4 | $Nd_{0.99}Sr_{0.01}CoO_{3-\delta}$ | −0.085 |
| 5 | $Sm_{0.1}Ba_{0.9}CoO_{3-\delta}$ | −0.101 |
| 6 | $Sm_{0.5}Ca_{0.5}CoO_{3-\delta}$ | −0.075 |
| 7 | $Nd_{0.8}Ca_{0.1}Sr_{0.1}CoO_{3-\delta}$ | −0.005 |

With the conventional carbon electrode using platinum catalyst the voltage thereon at the time of discharging with a current density of 100mA/cm² is about −0.26 volt as is seen from curve 1 in FIG. 3, while it is far above for the electrodes according to the present invention listed in the above Table, ranging from −0.005 to −0.101 volt.

In the composition formula listed above, δ ranges between 0 and 0.5. It depends upon non-stoichiometry of the above oxides, as mentioned earlier. While it is possible to determine the exact value of δ through chemical analysis of the composition, it can vary during the operation of the electrode. One of the important characters of the electrode is the percentage content of the constituent metal elements in the oxide constituting the electrode.

As has been described in the foregoing, the electrode according to the invention has superior performance and prolonged service life and is inexpensive compared to the conventional electrode of the same kind, and it may be used even as the opposite electrode for charging the metal electrode of air-metal electrode secondary batteries. This is extremely useful in that, for instance, it is possible to realize an air-zinc secondary battery, which is inexpensive and provides great energy density.

While the novel embodiments of the invention have been described, it will be understood that various omissions, modifications and changes in these embodiments may be made by one skilled in the art without departing from the spirit and scope of the invention.

What is claimed is:

1. An oxygen electrode material consisting essentially of a metal oxide having perovskite structure represented by the general formula:

$$A_{1-x}B_xCoO_{3-\delta}$$

wherein A represents at least one element selected from the group consisting of neodymium and samarium, B represents at least one element selected from the group consisting of barium, calcium and strontium, $0.01 \leq x \leq 0.9$, and $0 \leq \delta \leq 0.5$.

2. An oxygen electrode material according to claim 1, wherein A represents neodymium.

3. An oxygen electrode material according to claim 1, wherein A represents samarium.

4. An oxygen electrode material according to claim 1, wherein B represents barium.

5. An oxygen electrode material according to claim 1, wherein B represents calcium.

6. An oxygen electrode material according to claim 1, wherein B represents strontium.

7. An oxygen electrode material according to claim 1, wherein $x$ has a value between 0.1 and 0.2.

8. An oxygen electrode material according to claim 1, wherein $\delta$ has a value of 0.

9. An oxygen electrode material according to claim 1, wherein A represents a mixture of neodymium and samarium.

10. An oxygen electrode material according to claim 1, wherein B represents a mixture of barium, calcium and strontium.

11. An oxygen electrode material according to claim 1, wherein said metal oxide is $Nd_{0.8}Sr_{0.2}CoO_3$.

12. An oxygen electrode material according to claim 1, wherein said metal oxide is $Nd_{0.5}Sr_{0.5}CoO_3$.

13. An oxygen electrode material according to claim 1, wherein said metal oxide is $Sm_{0.7}Ba_{0.1}Ca_{0.1}Sr_{0.1}CoO_3$.

* * * * *